Oct. 1, 1963  F. A. VAN VOOREN  3,105,629
SAFETY CONTROL MECHANISM FOR ELECTRIC MOTOR-DRIVEN MACHINE
Filed April 27, 1961
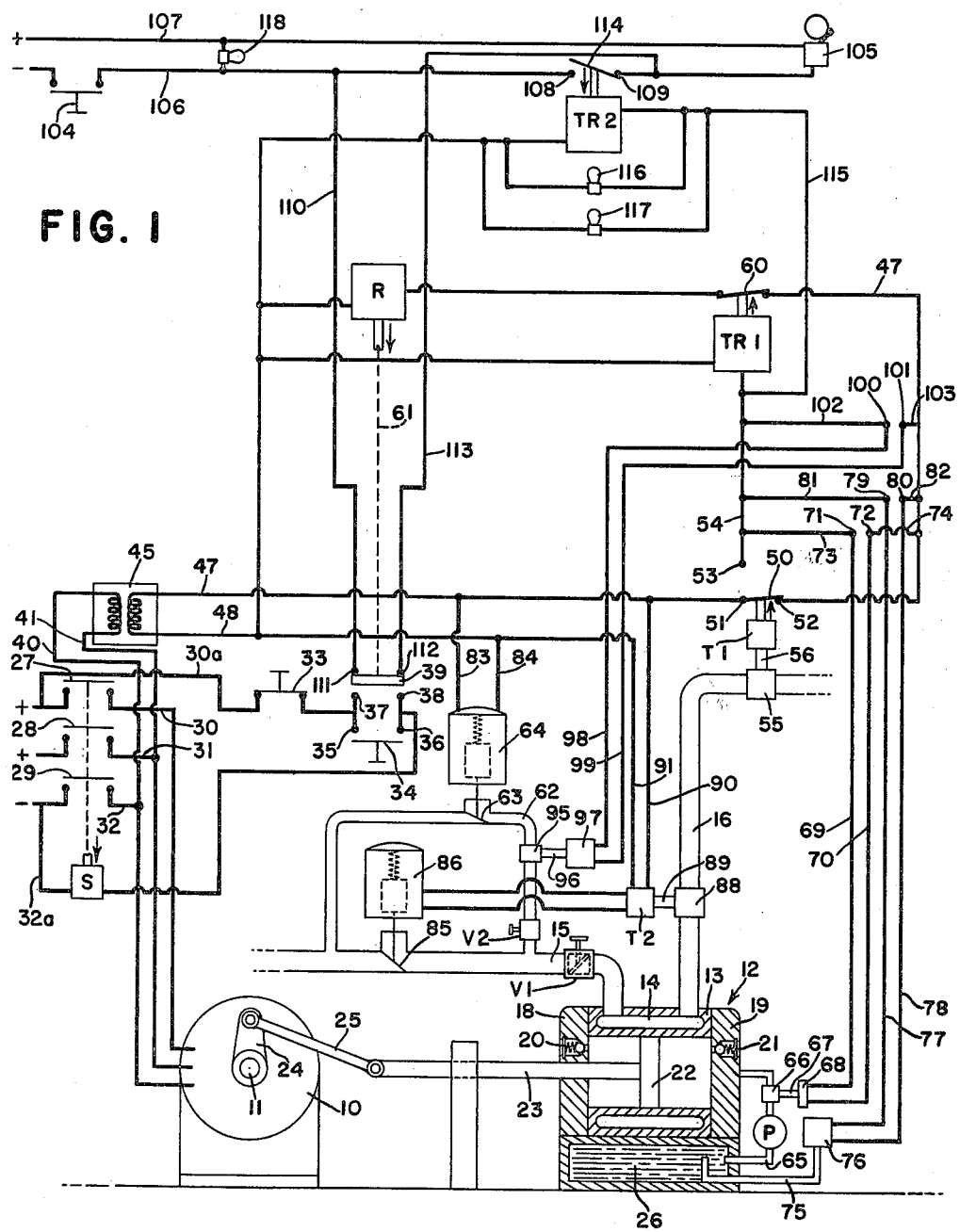
FIG. I
*INVENTOR.*
FRED A. VAN VOOREN
BY William A. Murray
ATTORNEY

United States Patent Office 3,105,629
Patented Oct. 1, 1963

3,105,629
SAFETY CONTROL MECHANISM FOR ELECTRIC MOTOR-DRIVEN MACHINE
Fred A. Van Vooren, 2133 9th St., East Moline, Ill.
Filed Apr. 27, 1961, Ser. No. 106,053
17 Claims. (Cl. 230—6)

This invention relates to a control mechanism for an electric motor-driven machine. More particularly it relates to an electrical control system for a motor-driven air compressor which utilizes a liquid cooling jacket and a pressurized lubricating system.

In large air compressors there is conventionally used a relatively large piston mounted in a cylinder and driven by an eccentric arm rotated by an electric motor. The piston reciprocates at a relatively high rate to create heat in the cylinder and its surrounding structure. To dissipate the heat there is provided a water cooled jacket with a steady flow of water therethrough. There is also provided a pressurized lubricating system for the piston and most moving parts of the assembly.

An installation of this type is, of course, very expensive. Consequently it is necessary to provide safety devices within the assembly which will automatically operate to shut down the assembly should some portion of it fail to function properly. In the usual variety of safety devices there are provided throw-out switches which respond to an improper operation of parts of the assembly to stop the unit. However, in many instances the switches will not operate properly. They may, for example, be welded shut and even, in some instances, the terminals for the switch will be shorted. The entire assembly will therefore continue to operate, resulting in expensive repair and maintenance costs.

It is therefore the main object of the present invention to provide an electrical control for such an assembly which is automatically placed in operation upon the assembly being started.

Specifically it is proposed to provide a transformer across the lines of the wires to the electric motor and beyond a manually operated switch to the motor so that as the motor is started the transformer will be energized. Extending from the transformer is a relay circuit which controls a relay switch closing the main circuit to the motor and transformer. Consequently once the manual switch is closed and the motor started, the relay switch will close and the manual switch may be released.

In the relay circuit of the present invention there are provided safety switches interconnected and operative in a new and unique manner, the first being controlled primarily by the temperature of the water in the cooling jacket and the second being responsive to abnormal supply and pressures in the water and lubricating systems. The switches are so related that should one fail to operate properly to break the circuit it will tend to control the other switch so that it may break the circuit.

It is also an object of the present invention to incorporate electromagnetic means in the relay circuit which will control the valve mechanism for the water feeding conduits so that flow of the coolant liquid or water will cease automatically upon the motor and compressor assembly stopping.

It is still a further object of the present invention to provide a suitable alarm system which will function should the automatic control switches not function properly in stopping the assembly.

Other objects and advantages of the invention will become apparent as the nature of the invention is better understood from the following disclosure and as shown in the accompanying drawing.

FIGURE 1 is a schematic view of an electric motor-driven air compressor and the associated electrical controls therefor.

The air compressor includes a main power source, here in the form of a three phase electric motor 10 with a main motor drive shaft 11. Connected to the motor 10 is an air compressor 12 including a cast cylindrical casing or jacket 13 which has a water receiving pocket 14, with a main water inlet pipe 15 leading into and for supplying water to the jacket 13 and a water discharge pipe 16 leading from the jacket. The casing 13 is closed at opposite ends by cylinder heads 18, 19. Air valves 20, 21 are provided in the head to permit compressed air to leave the casing 15. The valve openings may be connected to any conventional air conduits for discharging the compressed air.

Contained in the casing 13 is a piston 22 having a piston rod 23 extending through the end 18 and connected to the shaft 11 of the motor by a slider-crank mechanism including a crank arm 24 fixed to the shaft 11 and a connecting rod 25 extending between the end of the arm 24 and end of the piston rod 23. An oil reservoir 26 is provided in the base of the compressor 12.

Main power lines 30, 31, 32 provide power and are connected to the motor 10. Contained in the lines 30, 31, 32 are three starter switches 27, 28, 29 respectively controlled by a starter coil S. The coil S is connected to the lines 30, 32 by means of extension lines 30a and 32a at points before the respective starting switches 27, 29. A manual stop switch 33 is provided in the line 30a and is normally closed. A manually operated starting switch 34 is provided in the line 30a and is adapted to contact terminals 35, 36 for closing the circuit to the starting coil S. Upon energizing the coil S, the switches 27, 28, 29 will close and the motor 10 will start. The switch 34 is normally open and remains open unless specifically held closed. A second pair of contact terminals 37, 38 are provided in the line 30a for contact with a relay switch 39 which is controlled by automatic control means presently to be described.

A pair of lead lines 40, 41 extend from the main lines 32, 31 to a transformer 45. The transformer 45 will be energized only upon closing of one of the switches 28, 29. Extending from the transformer 45 is a relay circuit composed of a pair of lines 47, 48 extending to relay R. The line 47 has therein a thermostatic controlled first safety switch 50 extending between contacts 51, 52, the thermostatic control being indicated by the reference numeral $T_1$. A third contact 53 is provided for contact with the switch 50 and leads through a wire 54 to a time relay, $TR_1$, later to be explained. The control $T_1$ is effected by the temperature in the water discharge pipe 16, and will, upon abnormal high temperature, open the switch 50 between contacts 51, 52 and deenergize the relay R. This will open the main switch 39 and stop the motor 10. The pipe 16 has mounted thereon a coupling 55 and nipple 56 leading to the control $T_1$. The switch 50 is normally closed between contacts 51, 52. However, should the temperature of the discharge water reach an abnormally high temperature, which in the specific instance would be 130°, the switch 50 will swing open relative to contact 52 and will then close relative to contact 53 to close a circuit to time relay $TR_1$.

The time relay $TR_1$ operates a second safety switch 60, which is in series with the thermostatic or temperature responsive switch 50 and in the basic line 47 leading to the main relay R. The time relay normally maintains the switch 60 in a closed position. Consequently, since it is in series with the thermostatic switch 50, the circuit to the main relay R is normally closed.

Therefore, in closing the manual switch 34 the main relay R is energized. The relay R is connected to the relay switch 39, as indicated by the dotted line 61, and causes the switch to drop in contact with the contact terminals 37, 38. The manual switch 34 may then be released and the entire unit will be on automatic control.

Referring to the oil reservoir 26, there is provided a pipe 65 leading from the reservoir to oil pump P and from thence into the piston head 19 to where it will be properly channeled to various portions of the compressor mechanisms. Downstream from the pump P is a T-fitting 66 with a nipple 67 leading to a pressure switch 68. A pair of lead wires 69, 70 lead from the switch 68 to terminals 71, 72. A lead line 73 extends from the terminal 71 to the wire 54 and a lead line 74 extends from the main relay circuit wire 47 to the terminal 72. The switch 68 is normally opened. However, should the oil pressure become excessively low, such as might occur due to failure of the pump P, the switch 68 will close and the circuit between the main line 47 and the time relay $TR_1$ is closed to thereby cause the switch 60 to open. This will result in relay R being deenergized and the relay switch 39 raising. The starting coil S is deenergized and the circuit to the motor 10 is broken to thereby stop the entire assembly.

A level indicating pipe 75 is also inserted in the oil reservoir 26 and leads to an oil level switch 76 having a pair of wires 77, 78 leading to terminals 79, 80 on the ends of lead wires 81, 82 connected to the time relay line 54 and the main relay line 47 respectively. The switch 76 is normally open. However, should the oil supply or level become low the switch 76 will close thereby closing the circuit between the main relay line 47 and time relay $TR_1$. This will again result in the main relay R causing the relay switch 39 to open and to shut down the compressor assembly.

Referring now to the main water feeder line 15, there is provided a U-shaped by-pass pipe 62. Contained in the by-pass pipe 62 is a valve 63 controlled by a solenoid 64, the latter being connected to the relay circuit wires 47, 48 by connecting wires 83, 84 respectively. Upon energizing the transformer 45, the solenoid 64 will open the valve 63 in the by-pass pipe 62 thereby permitting the water to flow through the by-pass.

Contained in the main inlet pipe 15 and between the legs of the U-shaped by-pass line 62 is a main valve 85 which is controlled by a solenoid 86. The solenoid valve 85 is representative of one type of modulating or self-powered valve. Other types would, of course, operate in satisfactory manner. The solenoid 86 is controlled by a thermostatic switch $T_2$ connected to the water outlet pipe 16 by the T-fitting 88 and nipple 89. Lead wires 90, 91 extend from the transformer wires 47, 48 to the switch $T_2$ and then to the solenoid 86. The switch $T_2$ is effective to close at a relatively low tempertaure, as compared to the thermostat switch $T_1$ and to cause the valve 85 to open. In operation the water will first pass through the by-pass line 62 until the water reaches a pre-determined degree of temperature whereupon the switch $T_2$ will energize the solenoid 86 and open the main valve 85.

Downstream from the by-pass valve 63 and in the by-pass line 62 is a T-fitting 95 with a short nipple 96 leading to a pressure switch 97. The switch 97 has lead wires 98, 99 leading to terminals 100, 101 connected to wires 102, 103 extending to the wire 54 and wire 47 respectively. At times it is desirable to drain off the liquid in the discharge pipe 16 or the water jacket 13 to thereby temporarily release the pressure in the water flow. In order to maintain sufficient pressure to maintain the pressure switch 97 open, a throttle valve V-1 is provided in the line 15 just prior to its connection to the jacket 13. A manually operated needle valve V-2 is provided in the by-pass line 62 for purposes of adjusting the quantity of flow through the by-pass line. The switch 97 is normally open. However, should the water pressure be reduced lower than is determined to be necessary for proper cooling, the switch 97 will close thereby causing time relay $TR_1$ to open the switch 60 to deenergize main relay R and to open the relay switch 39.

An alarm system is provided in combination with the automatic control system and consists of a main alarm such as a bell 105 having an outside source of power as indicated by circuit wires 106, 107. A manual switch 104 is provided in the latter circuit. The wire 108 is open between a pair of terminals 108, 109. A wire 110 extends downwardly from the wire 106 at one side of the terminals 108, 109 to a terminal 111 adapted for contact with one end of the main relay switch 39. A second contact terminal 112 is provided adjacent the opposite end of the switch 39. The terminal is on the lower end of a wire 113 which connects to the wire 106 beyond the pair of terminals 108, 109. Viewing the drawing, it becomes apparent that the relay R, when it withdraws the switch 39 from contact with the contacts 37, 38, closes the contacts 111, 112 and sets off the alarm 105. Since the alarm 105 would otherwise remain ringing, the manual switch 104 is provided to open the circuit.

A second switch 114 is provided to close the terminals 108, 109 and is controlled by a second time relay $TR_2$. The switch 114 is normally open and will close only upon the time relay $TR_2$ being energized. Power is fed to the relay $TR_2$ by a wire 115 extending from the wire 54 which leads to the first time relay $TR_1$. The switch 114 operated by time relay $TR_2$ therefore becomes a safety feature in the automatic control circuit. Should the time relay $TR_1$ or the switch 60 fail to open upon current flow to the relay $TR_1$, the second time relay $TR_2$ will close to thereby sound the alarm 105. Therefore, while the compressor might not stop, the ringing of the alarm 105 will indicate a malfunction in the assembly.

Positioned in parallel to the second time relay $TR_2$ is a pair of lights 116, 117 which are for the purpose of indicating faulty oil pressure, water pressure, or a low oil level in the assembly. As will later become apparent, it may indicate the water jacket 13 is overheated. One of the lights may be placed at a point adjacent the assembly while the other may be at a remote area. A third light 118 extends between the lines 106, 107 and indicates the alarm circuit is energized or that the switch 104 is closed.

Normally the time relay $TR_2$ has a longer period prior to operation than the time relay $TR_1$. This permits the time relay $TR_1$ to stop operation of the assembly prior to causing the alarm 105 to be energized by the relay switch 114 controlled by the time relay $TR_2$.

When the entire assembly is not in operation the water pressure switch 97, the oil pressure switch 68 and oil level switch 76 are closed. One of the purposes of providing time relays $TR_1$ and $TR_2$ is to permit initial operation of the assembly and to permit these latter switches to open. Immediately upon closing the manual switch 34 the solenoid 64 will open the valve 63 and permit pressure in the by-pass pipe 62. However, should no pressure exist in the pipe at this time the switch 97 will remain closed and eventually cause $TR_1$ to open its switch 60 thereby breaking the circuit to the motor. The oil pressure switch 68 as well as the oil level switch will operate in a similar manner.

Should the water in the jacket become overheated, the thermostat switch 50 will be opened and will close the circuit through wire 54 and 115 to the time relays $TR_1$, $TR_2$. The latter action is an additional safety feature since possibly the terminals 51, 52 may remain closed due to a short or other malfunction in the relay circuit. This would result in the time relay switch 60 opening to cause the main relay R to open. Should both the switches 50 and 60 fail to open the circuit to the main relay R, then the second time relay $TR_2$ would cause the alarm 105 to sound even though the compressor would continue in operation. Also, the lights 116, 117 would light up also indicating a malfunction in the compressor operation.

Should the main relay R be deenergized, the switch 39 will close the circuit to the alarm 105 and cause it to sound, thereby indicating the compressor has stopped running.

While only one form of the invention has been shown, it should be recognized that other forms and variations will occur to those skilled in the art. Therefore, it should be understood the present disclosure was shown and described in detailed manner for purposes of clearly and concisely illustrating the principles of the invention and was not intended to limit or narrow the invention beyond the broad concept set forth in the appended claims.

What is claimed is:

1. In combination, an electric motor; a motor-driven compressor having a liquid cooling jacket with a liquid inlet conduit and a liquid outlet conduit and further having a lubricant flow system including a lubricant reservoir; pump means maintaining flow pressure for the lubricant; a main electrical power source; a manual switch for closing an electrical circuit from the power source to the motor, said switch being retained open unless held in closed position; a transformer connected to the main power source and energized initially through closing of said manual switch; a relay circuit leading from the transformer and including a relay switch effective upon energizing of the relay to close the circuit to the motor and transformer; a first safety switch associated with the liquid discharge conduit in said relay circuit effective to open said relay circuit upon a pre-determined temperature in the discharge liquid; a second safety switch in the relay circuit; a first time delay relay for opening said second safety switch; a lubricant pressure switch in the lubricant flow system effective upon abnormal pressure in the lubricant system to close a circuit to and to energize the time delay relay; a lubricant level switch associated with the lubricant reservoir and effective upon insufficient supply of said lubricant to close a circuit to and energize the time delay relay; a liquid pressure switch associated with the liquid inlet conduit effective upon abnormal pressure in the conduit to close a circuit to and energize the time delay relay; an alarm circuit having an open alarm switch therein effective upon closing to provide an alarm; and a second time delay relay in parallel with said first time delay relay and effective to be energized upon said lubricant pressure switch, said lubricant level switch, or said liquid pressure switch being closed, said second time relay being associated with said alarm switch for closing the switch.

2. In combination, an electric motor; a motor-driven compressor having a liquid cooling jacket with a liquid inlet conduit and a liquid outlet conduit and further having a lubricant flow system including a lubricant reservoir; pump means maintaining flow pressure for the lubricant; a main electrical power source including an electrical circuit to the motor; a transformer connected to the main power source and energized when said electrical circuit is closed; a relay circuit leading from the transformer and including a relay switch effective upon energizing of the relay to close the circuit to the motor; a first safety switch associated with the liquid discharge conduit in said relay circuit effective to open said relay circuit upon a pre-determined temperature in the discharge liquid; a second safety switch in the relay circuit; a first time delay relay for opening said second safety switch; a lubricant pressure switch in the lubricant flow system effective upon abnormal pressure in the lubricant system to close a circuit to and to energize the time delay relay; a lubricant level switch asociated with the lubricant reservoir and effective upon insufficient supply of said lubricant to close a circuit to and energize the time delay relay; a liquid pressure switch associated with the liquid inlet conduit effective upon abnormal pressure in the conduit to close a circuit to and energize the time delay relay; an alarm circuit having an open alarm switch therein effective upon closing to provide an alarm; a second time delay relay in parallel with said first time delay relay and effective to be energized upon said lubricant pressure switch, said lubricant level switch, or said liquid pressure switch being closed, said second time relay being associated with said alarm switch for closing the switch, and means for initially closing the electrical circuit to the motor.

3. In combination, an electric motor; a motor-driven compressor having a liquid cooling jacket with a liquid inlet conduit and a liquid outlet conduit and further having a lubricant flow system including a lubricant reservoir; pump means maintaining flow pressure for the lubricant; a main electrical circuit to the motor; a transformer; a relay circuit leading from the transformer and including a relay switch effective upon energizing of the relay to close the main electrical circuit to the motor; a first safety switch associated with the liquid discharge conduit in said relay circuit effective to open said relay circuit upon a predetermined temperature in the discharge liquid; a second safety switch in the relay circuit; a first time delay relay for opening said second safety switch; a lubricant pressure switch in the lubricant flow system effective upon abnormal pressure in the lubricant system to close a circuit to and energize the time delay relay; a lubricant level switch associated with the lubricant reservoir and effective upon insufficient supply of said lubricant to close a circuit to and energize the time delay relay; a liquid pressure switch associated with the liquid inlet conduit effective upon abnormal pressure in the conduit to close a circuit to and energize the time delay relay; an alarm circuit having an open alarm switch therein effective upon closing to provide an alarm; a second time delay relay in parallel with said first time delay relay and effective to be energized upon said lubricant pressure switch, said lubricant level switch, or said liquid pressure switch being closed to be energized, said second time relay being associated with said alarm switch for closing the switch; and means connected to the main power source for energizing the transformer.

4. The invention defined in claim 3 in which the first safety switch is a two-way switch and will upon said predetermined temperature being reached close a circuit to said time delay relay.

5. In combination, an electric motor; a motor-driven compressor having a liquid cooling jacket with a liquid inlet conduit and a liquid outlet conduit and further having a lubricant flow system including a lubricant reservoir; pump means maintaining flow pressure for the lubricant; a main electrical circuit to the motor; a transformer; a relay circuit leading from the transformer and including a relay switch effective upon energizing of the relay to close the main electrical circuit to the motor; a safety switch associated with the liquid discharge conduit in said relay circuit effective to open said relay circuit upon a predetermined temperature in the discharge liquid; an alarm circuit having an open alarm switch therein and effective upon closing to sound the alarm; a time delay for closing said alarm switch; a lubricant pressure switch in the lubricant flow system effective upon abnormal pressure in the lubricant flow system to close a circuit to and energize the time delay relay; a lubricant level switch associated with the lubricant reservoir and effective upon insufficient supply of said lubricant to close a circuit to and energize the time delay relay; a liquid pressure switch associated with the liquid inlet conduit effective upon abnormal pressure in the conduit to close a circuit to and energize the time delay relay; and means connected to the main power source for energizing the transformer.

6. The invention defined in claim 5 in which the safety switch is a two-way switch and will upon said predetermined temperature being reached close a circuit to said time delay relay.

7. The invention defined in claim 5 in which the relay switch in the relay circuit will upon opening the main electrical circuit close said alarm circuit to thereby sound the alarm.

8. In combination, an electric motor; a motor-driven machine having a liquid cooling system with a liquid inlet conduit and a liquid outlet conduit and further having a pressurized lubricant flow system; a main electrical circuit from a power source connected to the motor, a switch for closing the electrical circuit; a transformer connected to the main power source and energized through closing of said switch; a relay circuit leading from the transformer and including a relay switch effective upon energizing of the relay to also close the circuit to the motor and transformer; a safety switch in the relay circuit; a first time delay relay for opening said safety switch; a lubricant pressure switch in the lubricant flow system effective upon abnormal pressure in the lubricant system to close a circuit to and energize the time delay relay; a lubricant supply switch associated with the lubricant system and effective upon insufficient supply of said lubricant to close a circuit to and energize the time delay relay; a liquid pressure switch associated with the liquid inlet conduit effective upon abnormal pressure in the conduit to close the circuit to and energize the time delay relay; an alarm circuit having an open alarm switch therein effective upon closing to provide an alarm; and a second time delay relay in parallel with said first time delay relay and effective to be energized upon said lubricant switch, said lubricant supply switch, or said liquid pressure switch being closed, said second time relay being associated with said alarm switch for closing the switch.

9. In combination, an electric motor; a motor-driven machine having a liquid cooling system with liquid inlet and outlet means and further having a pressurized lubricant flow system; a main electrical circuit from a power source connected to the motor; a switch for closing the electrical circuit; a transformer connected to the main power source and energized through closing of said switch; a relay circuit leading from the transformer and including a relay switch effective upon energizing of the relay to also close the circuit to the motor and transformer; a safety switch in the relay circuit; a first time delay relay for opening said safety switch; lubricant switch means in the lubricant flow system effective upon abnormal operation of the lubricant system to close a circuit to and energize the time delay relay; liquid switch means associated with the liquid cooling system effective upon abnormal conditions in the flow of liquid to close the circuit to and energize the time delay relay; an alarm circuit having an open alarm switch therein effective upon closing to provide an alarm; and a second time delay relay in parallel with said first time delay relay and effective to be energized upon at least one of said lubricant switch means and said liquid switch means being closed, said second time relay being associated with said alarm switch for closing the switch.

10. In combination, an electric motor; a motor-driven machine having a liquid cooling system with liquid inlet and outlet means and further having a pressurized lubricant flow system; a main electrical circuit from a power source connected to the motor; a switch for closing the electrical circuit; a transformer connected to the main power source and energized through closing of said switch; a relay circuit leading from the transformer and including a relay switch effective upon energizing of the relay to also close the circuit to the motor and transformer independently of said switch for closing the electrical circuit whereby the latter switch may open without effecting operation of the motor; a safety switch in the relay circuit; a first time delay relay for opening said safety switch; lubricant switch means associated with the lubricant flow system and effective upon abnormal operation of the lubricant system to energize the time delay relay; and a liquid switch means associated with the outlet means of the liquid cooling system effective upon abnormal conditions in the liquid flowing from the cooling system to energize the time delay relay.

11. The invention defined in claim 10 in which the liquid inlet means in the liquid cooling system includes a main inlet conduit with a main valve therein and a by-pass conduit connected to the main conduit for by-passing the main valve; and further characterized by a by-pass valve in the by-pass conduit; electromagnetic means connected to said relay circuit and responsive to closing of the circuit to open the by-pass valve; and temperature responsive means extending from the outlet means of the cooling system to the main valve for opening and closing the main valve according to the temperature of the liquid in the outlet means.

12. The invention defined in claim 11 in which the main valve is controlled by an electromagnetic means connected to the relay circuit, and the temperature responsive means is a thermostat switch mounted in the liquid outlet effective to energize the electromagnetic means.

13. The invention defined in claim 11 in which the liquid switch means includes a pressure switch in the bypass conduit and downstream from the by-pass valve.

14. The invention defined in claim 9 in which the second time relay has a longer time delay period than the first time relay.

15. In combination, an electric motor; a motor-driven machine having a liquid cooling system and a pressurized lubricant flow system; a main electrical circuit from a power source connected to the motor; a switch for closing the electrical circuit; a transformer connected to the main power source and energized initially through closing of said switch; a relay circuit leading from the transformer and including a relay switch substantially effective upon energizing of the relay to close the circuit to the motor and transformer independently of said switch for closing the electrical circuit whereby the latter switch may open without effecting operation of the motor; a temperature-responsive safety switch associated with the liquid cooling system positioned in said relay circuit effective to open said relay circuit upon an abnormally high temperature in the cooling liquid; and a safety relay switch in the relay circuit responsive to abnormal flow conditions in said liquid cooling system and said pressurized lubricant flow system to open said relay circuit.

16. In combination, an electric motor; a motor-driven machine having a liquid cooling system; a main electrical circuit from a power source to the motor; a switch for closing the electrical circuit; a transformer connected to the main power source and energized initially through closing of said switch; a relay circuit leading from the transformer and including a relay switch substantially effective upon energizing of the relay to close the circuit to the motor and transformer independently of said switch for closing the electrical circuit whereby the latter switch may open without effecting operation of the motor; and a temperature-responsive safety switch associated with the liquid cooling system downstream from the machine positioned in said relay circuit effective to open said relay circuit upon an abnormally high temperature in the cooling liquid.

17. The invention defined in claim 10 in which the liquid switch means includes a pressure switch in the liquid inlet means which closes upon a pressure drop therein and a temperature responsive switch in the outlet means which closes upon abnormally high temperature in the liquid.

References Cited in the file of this patent
UNITED STATES PATENTS

| 1,400,133 | Aikman | Dec. 13, 1921 |
| 2,130,608 | Aikman | Sept. 20, 1938 |
| 2,137,221 | Aikman | Nov. 22, 1938 |
| 2,346,886 | Williams | Apr. 18, 1944 |
| 2,371,345 | Monroe | Mar. 13, 1945 |
| 2,793,803 | Yerger | May 28, 1957 |

FOREIGN PATENTS

| 392,116 | Great Britain | May 11, 1933 |